(12) United States Patent
Wilhite

(10) Patent No.: US 8,783,697 B1
(45) Date of Patent: Jul. 22, 2014

(54) HOLDER FOR HOLDING BOTTLES IN A SHOPPING CART AND METHOD OF USE

(71) Applicant: Riley Scott Wilhite, Manhattan Beach, CA (US)

(72) Inventor: Riley Scott Wilhite, Manhattan Beach, CA (US)

( * ) Notice: Subject to any disclaimer, the term of this patent is extended or adjusted under 35 U.S.C. 154(b) by 0 days.

(21) Appl. No.: 13/766,315

(22) Filed: Feb. 13, 2013

(51) Int. Cl.
*B62D 39/00* (2006.01)

(52) U.S. Cl.
USPC .................. 280/33.992; 280/DIG. 4; 224/411

(58) Field of Classification Search
USPC ............. 280/33.991, 33.992, 33.996, 33.997, 280/DIG. 3, 4; 224/411
See application file for complete search history.

(56) References Cited

U.S. PATENT DOCUMENTS

| | | | |
|---|---|---|---|
| 2,296,028 A * | 9/1942 | Gribble | 211/74 |
| 2,763,413 A * | 9/1956 | Felton | 224/411 |
| 3,534,973 A | 10/1970 | Elliott | |
| 4,560,096 A * | 12/1985 | Lucas et al. | 224/411 |
| 6,354,612 B1 * | 3/2002 | Adamson | 280/33.992 |
| 6,565,102 B2 * | 5/2003 | Buckley, III | 280/33.992 |
| D484,666 S * | 12/2003 | Caya | D34/27 |
| 8,061,538 B2 * | 11/2011 | Seldon | 211/74 |
| 8,162,331 B2 * | 4/2012 | Simonson et al. | 280/47.35 |
| D689,282 S * | 9/2013 | Lindeman | D3/231 |
| 2003/0075888 A1 * | 4/2003 | Buckley | 280/33.992 |
| 2006/0186621 A1 * | 8/2006 | Buckley, III | 280/33.992 |

* cited by examiner

*Primary Examiner* — John Walters
*Assistant Examiner* — Brian Swenson
(74) *Attorney, Agent, or Firm* — Ted Masters

(57) ABSTRACT

A holder holds bottles in a shopping cart having a wall and a main compartment having a floor. The holder includes a rack which has a plurality of apertures which are shaped and dimensioned to receive the bottles. The rack is rotatably connectable to the wall of the shopping cart so that the rack is disposed in the main compartment of the shopping cart. When connected to the wall of the shopping cart, the rack is selectively rotatable (1) to a not-in-use position substantially parallel to the wall of the shopping cart, and (2) to an in-use position substantially parallel to the floor of the main compartment.

5 Claims, 9 Drawing Sheets

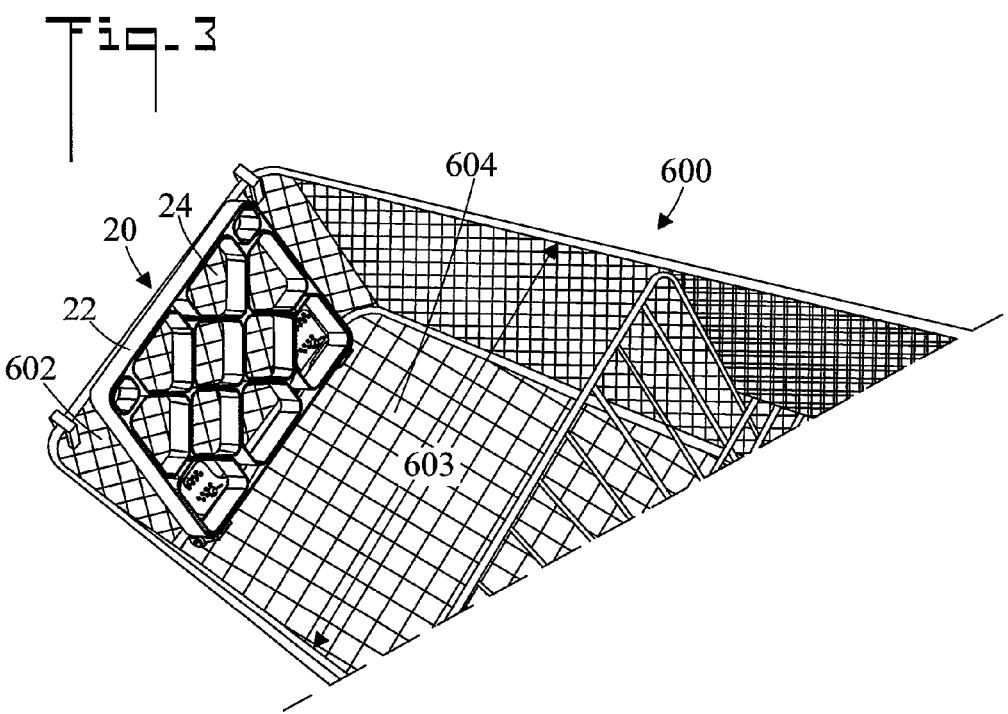
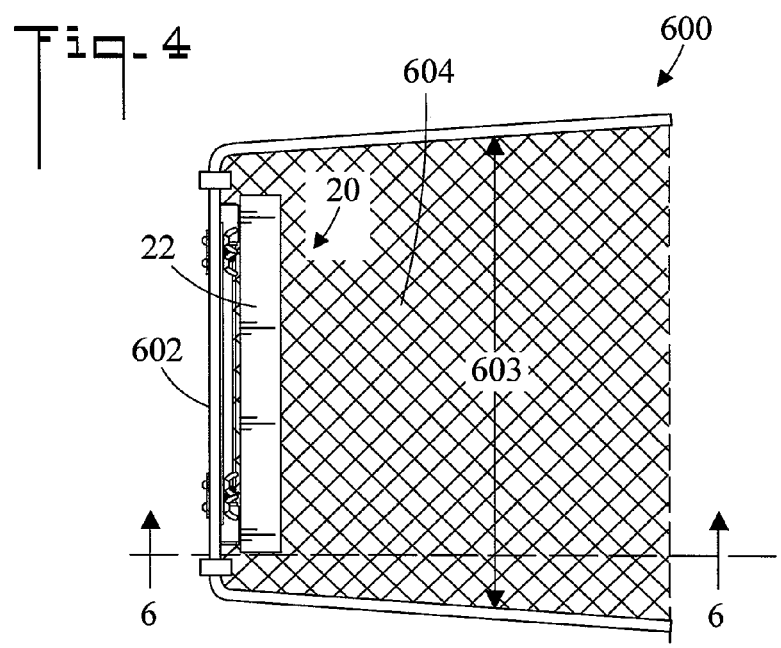

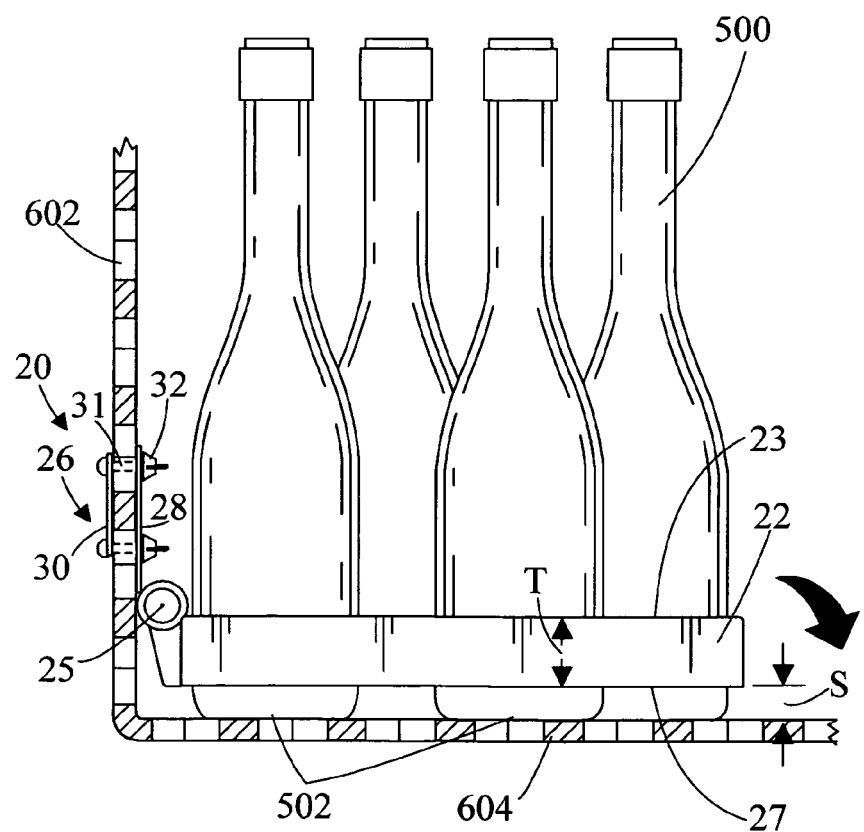

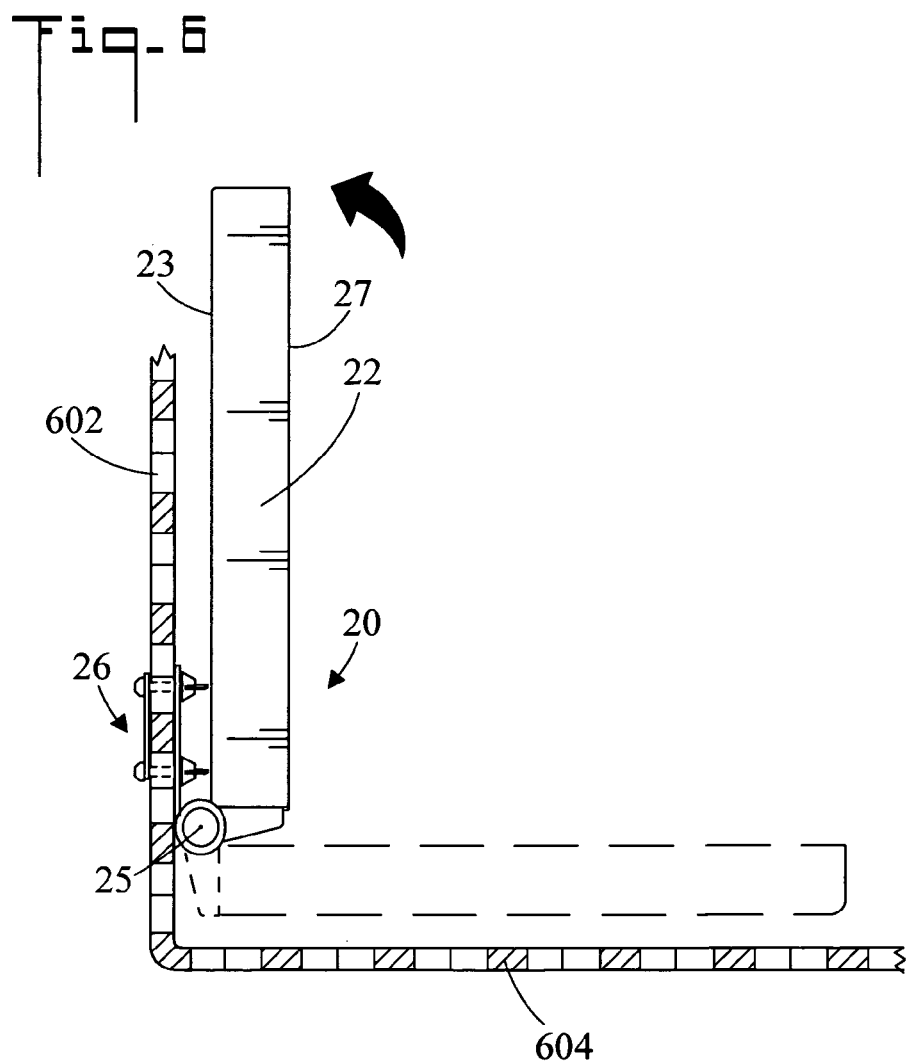

HOLDER FOR HOLDING BOTTLES IN A SHOPPING CART AND METHOD OF USE

CROSS REFERENCE TO RELATED APPLICATION

None.

TECHNICAL FIELD

The present invention pertains generally to bottles, and more particularly to a holder which can be mounted in a shopping cart to hold bottles.

BACKGROUND OF THE INVENTION

The standard shopping cart has no provision for securing bottles within the main compartment of the cart. This can result in the bottles shifting, sliding, falling over, rolling around, and possibly breaking.

BRIEF SUMMARY OF THE INVENTION

The present invention is directed to a holder which can be installed in the main compartment of a conventional shopping cart. The holder connects to a wall of the shopping cart, where it can be folded up to a not-in-use position adjacent the wall, and folded down to an in-use position adjacent the floor of the main compartment. In the in-use position, the holder securely holds the bottles so that they cannot shift, slide, fall over, roll or break. The holder has a rack which has a plurality of bottle-accepting apertures into which the bottles can be loaded. The holder provides an efficient and easy way to store bottles of various sizes and shapes, such as wine bottles, milk bottles, juice bottles, liquor bottles, and the like. Some of the features and advantages of the holder are;
- the holder can be attached to an existing shopping cart
- provides a more efficient shopping experience
- the holder is made of durable, lightweight environmentally friendly polymer.
- the holder is easy to install and use
- the holder holds multiple bottles in the front section of the main compartment of the shopping cart, thereby allowing the rear section of the shopping cart to be used for standard groceries
- by using different aperture sizes, the holder can accommodate different size bottles In accordance with an embodiment, a holder holds bottles in a shopping cart, the shopping cart having a wall and a main compartment having a floor. The holder includes a rack which has a plurality of apertures which are shaped and dimensioned to receive the bottles. The rack is rotatably connectable to the wall of the shopping cart so that the rack is disposed in the main compartment of the shopping cart. When connected to the wall of the shopping cart, the rack is selectively rotatable (1) to a not-in-use position substantially parallel to the wall of the shopping cart, and (2) to an in-use position substantially parallel to the floor of the main compartment.

In accordance with another embodiment, the bottles each have a base. When the rack is in the in-use position, the bottles are insertable into the apertures so that the bases rest upon the floor of the main compartment.

In accordance with another embodiment, the bottles serve to retain the rack in the in-use position.

In accordance with another embodiment, the holder includes a connector for connecting the rack to the wall of the shopping cart. The connector includes a first member which is rotatably connected to the rack, and a second member. Connection of the connector to the wall of the shopping cart is effected by clamping the wall of the shopping cart between the first member and the second member.

In accordance with another embodiment, the first member of the connector includes a biasing mechanism which urges the rack to the not-in-use position.

In accordance with another embodiment, the first member is connectable to the wall of the shopping cart so that when the rack is in the in-use position the rack is spaced apart from the floor of the main compartment.

In accordance with another embodiment, the rack has a thickness of between about 0.5 inches and about 1.0 inches Other embodiments, in addition to the embodiments enumerated above, will become apparent from the following detailed description, taken in conjunction with the accompanying drawings, which illustrate, by way of example, the principles of the holder and method of use.

BRIEF DESCRIPTION OF THE DRAWINGS

FIG. 3 is a reduced perspective view of the holder in an not-in-use position;

FIG. 4 is a top plan view of the holder in the not-in-use position;

FIG. 5 is a cross sectional view along the line 5-5 of FIG. 2;

FIG. 6 is a cross sectional view along the line 6-6 of FIG. 4;

DETAILED DESCRIPTION OF THE INVENTION

Figure 1:
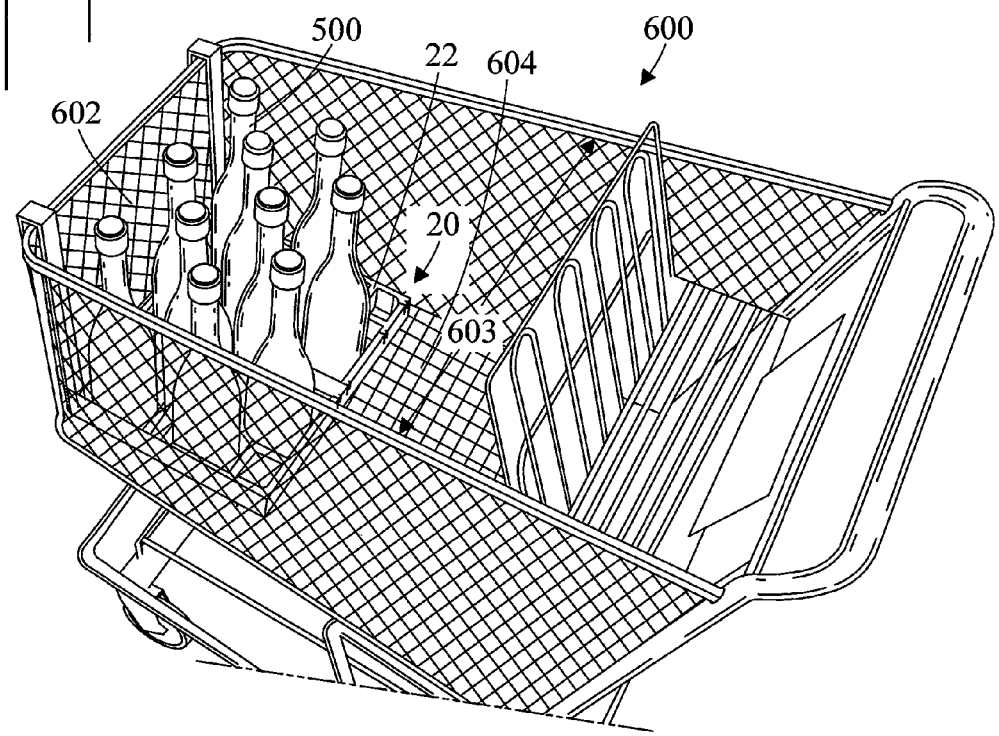
FIG. 1 is a reduced perspective view of a holder for holding bottles in a shopping cart; with the holder in an in-use position holding bottles.
Figure 2:
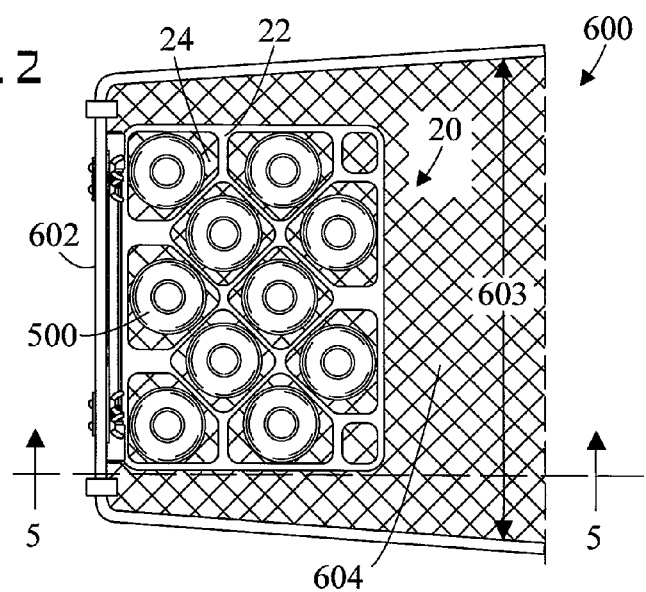
FIG. 2 is a top plan view of the holder in the in-use position holding bottles.
Figure 7:
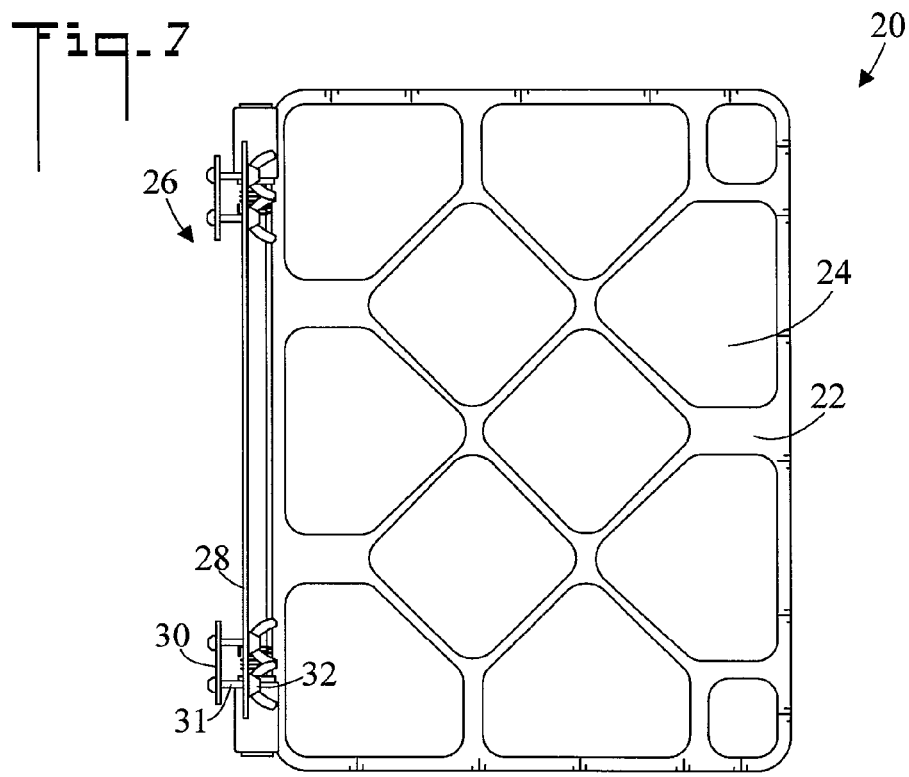
FIG. 7 is a top plan view of the holder.

Referring initially to FIGS. 1-2, there are illustrated reduced perspective and reduced top plan views respectively of a holder 20 for holding bottles 500 in a shopping cart 600, with the holder 20 in an in-use position holding bottles 500. FIGS. 3-4 are reduced perspective and reduced top plan views respectively of holder 20 in a not-in-use position. Shopping cart 600 has a wall 602 (also refer to FIG. 14 and the associated discussion) and a main compartment 603 having a floor 604. Main compartment 603 is the large compartment where chosen items are placed, as opposed to an upper secondary compartment such as those which can also serve as a child seat. Holder 20 includes a rack 22 (refer also to FIGS. 7-10) which has a plurality of apertures 24 which are shaped and dimensioned to receive bottles 500. Apertures 24 can be of different sizes and shapes as is shown in FIG. 7, or could simply be circular to accommodate circular bottles 500. The different sizes and shapes of apertures 24 can be selected to accommodate bottles 500 of different sizes and shapes. In the shown embodiment, bottles 500 are wine bottles, however other types of bottles 500 such as milk bottles, juice bottles, liquor bottles, etc. can also be used with holder 20.

Rack 22 is rotatably connectable to wall 602 of shopping cart 600 so that rack 22 is disposed in main compartment 603 of shopping cart 600. In the shown embodiment, rack 22 is connected to the front wall 602 of shopping cart 600. These leaves room behind holder 20 for storing other items such as standard groceries. However it may be appreciated that connection of holder 20 could also be made to one of the side walls or to the rear wall. When connected to wall 602 of shopping cart 600, rack 22 is selectively rotatable (1) to an upward not-in-use position substantially parallel to wall 602 of the shopping cart 600 as shown in FIGS. 3 and 4, and (2) to a downward in-use position substantially parallel to the floor 604 of main compartment 603 as is shown in FIGS. 1 and 2. It is noted that in the embodiment shown in FIGS. 5 and 6 it is the top 23 and bottom 27 sides of rack 22 which are parallel to either wall 602 or floor 604. Also, rack 22 is rotatable about axis 25 (refer to FIGS. 5, 6, and 8).

FIG. 5 is a cross sectional view along the line 5-5 of FIG. 2 showing rack 22 in the in-use position holding bottles 500. Rack 22 has been folded down by a user from the not-in-use position of FIGS. 3, 4 and 6. Bottles 500 each have a base 502. When rack 22 is in the downward in-use position, bottles 500 are insertable into apertures 24 (refer to FIG. 7) so that bottles 500 reside in an upright position with bases 502 resting upon floor 604 of main compartment 603 of shopping cart 600. In this position, bottles 500 serve to retain rack 22 in the in-use position. That is, once inserted, bottles 500 prevent rack 22 from rotating to the not-in-use position. In an embodiment, rack 22 has thickness T which increases the contact area with bottles 500. By increasing the contact area, there is less tendency for rack 22 to mar the labels of bottles 500. In an embodiment, thickness T is between about 0.5 inches and about 1.0 inches.

Also referring to FIGS. 7-11, holder 20 includes a connector 26 for connecting rack 22 to wall 602 of shopping cart 600. In the shown embodiment, connector 26 includes a first member 28 which is rotatably connected to rack 22 at axis 25, and a second member 30 (two in the shown embodiment). First member 28 is connectable to wall 602 of shopping cart 600 so that when rack 22 is in the in-use position, rack 22 is spaced apart from floor 604 of shopping cart 600 (as indicated by S). Connection of connector 26 to wall 502 of shopping cart 600 is effected by clamping wall 602 of the shopping cart 600 between first member 28 and second member 30. In the shown embodiment the clamping is accomplished by screws 31 and wing nuts 32.

Figure 8:
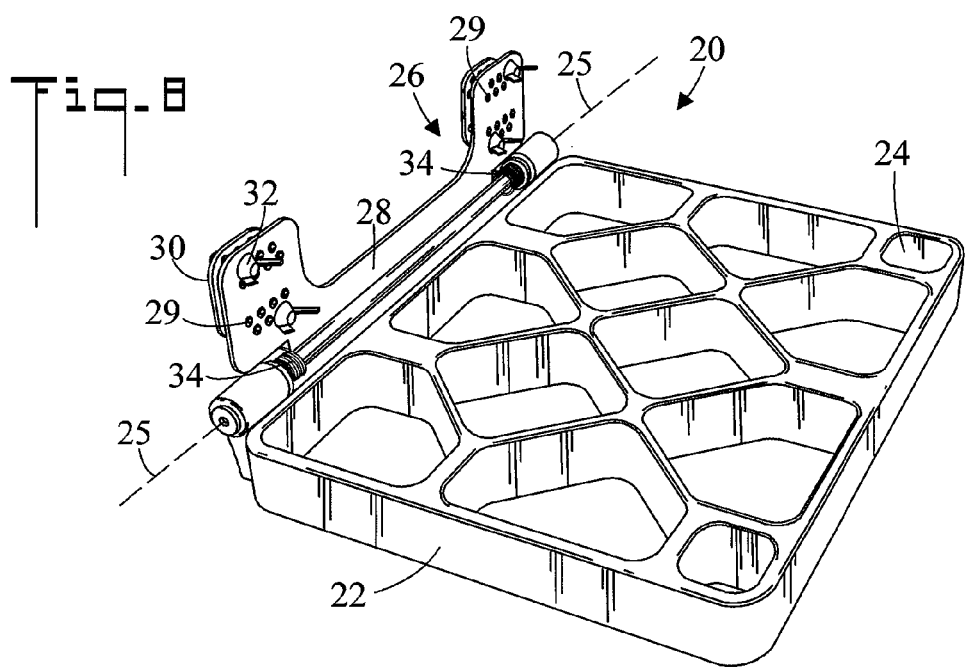
FIG. 8 is a perspective view of the holder.
Figure 9:
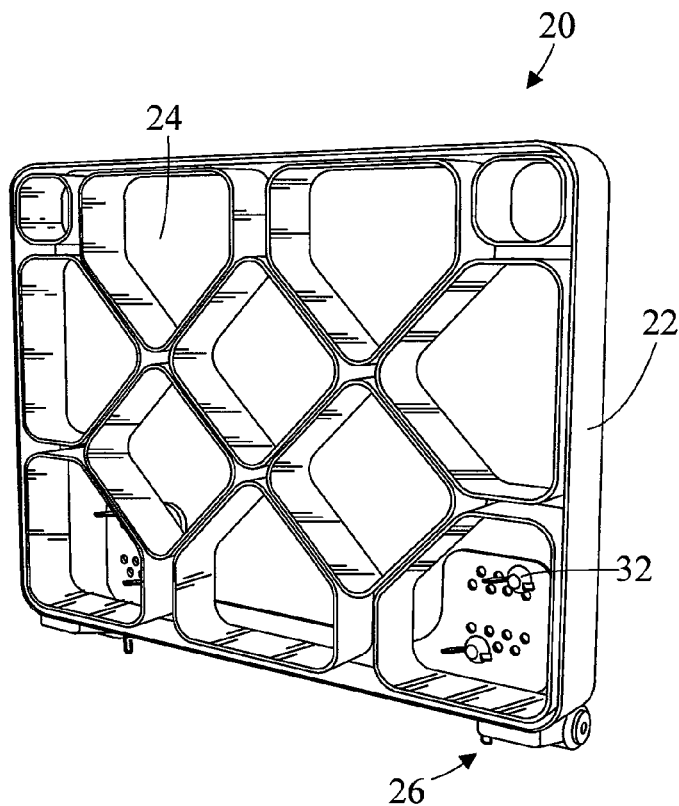
FIG. 9 is another perspective view of the holder.
Figure 10:
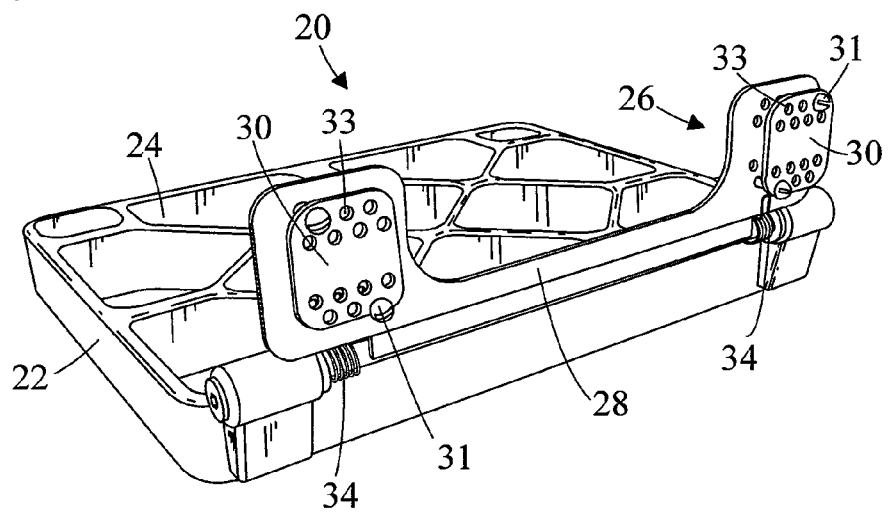
FIG. 10 is another perspective view of the holder.

FIG. 6 is a cross sectional view along the line 6-6 of FIG. 4, showing rack 22 in the not-in-use position. Referring also to FIG. 8, first member 28 of connector 26 includes a biasing mechanism 34 which urges rack 22 to the not-in-use position. In the shown embodiment, biasing mechanism includes two torsion springs 34 which cause rack 22 to rotate toward wall 602 of shopping cart 600 from the in-use position shown in dashed lines.

FIGS. 7-10 are top plan and three perspective views of holder 20. Shown are rack 22, apertures 24, connector 26, first member 28, second member 30, screws 31, wing nuts 32, and torsion springs 34. In FIG. 8 it is noted that first member 28 has a plurality of screw holes 29. Similarly in FIG. 10, second member 30 also has a plurality of screw holes 33 which cooperate with screw holes 29 of first member 28. These screw holes 29 and 33 accept screws 31. In mounting holder 20, the multiple screw holes 29 and 33 allow the user to select the holes which are most suited to the particular wall 602 of the shopping cart 600 (refer also to FIGS. 11 and 14 and the associated discussions).

Figure 11:
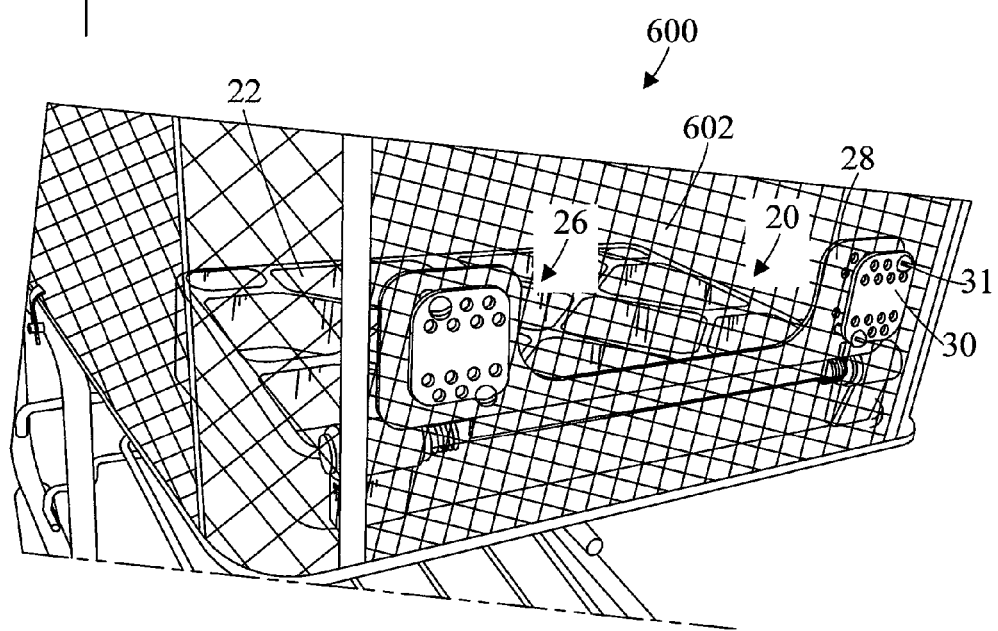
FIG. 11 is a perspective view of a connector for connecting the holder to a wall of the shopping cart.

FIG. 11 is a perspective view of connector 26 connecting holder 20 to the wall 602 of shopping cart 600. Connector 26 is clamped to wall 602 of shopping cart 600. Screws 31 pass through holes 605 (refer to FIG. 14) in wall 602 and connect first member 28 to second member 30 with wall 602 disposed therebetween.

Figure 12:
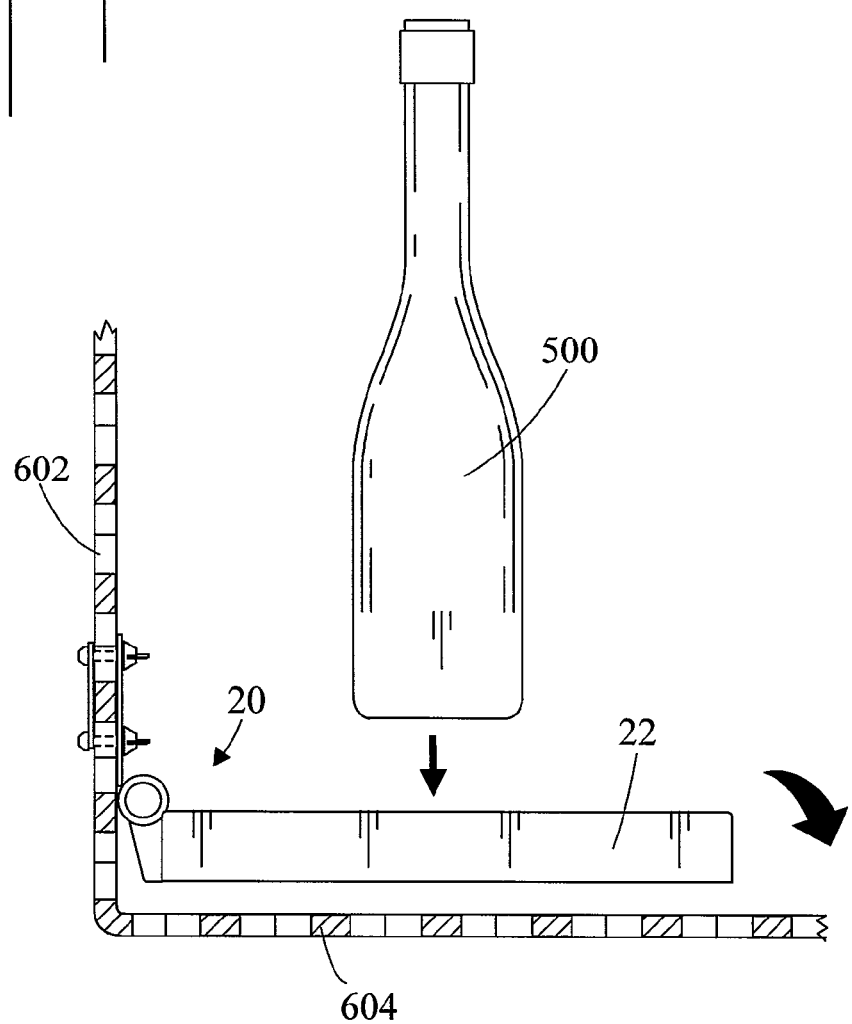
FIG. 12 is a cross sectional view as in FIG. 5 showing a bottle being inserted into the holder.

FIG. 12 is a cross sectional view as in FIG. 5 showing a bottle 500 being inserted into holder 20, with holder 20 rotated to the in-use position. Bottle 500 is inserted into an aperture 24 (refer to FIG. 7) so that the longitudinal axis of the bottle is substantially perpendicular to rack 22 and rests upon floor 604. It is noted that holder 20 including rack 22 is removably connected to wall 602, however in most applications once installed holder 20 will remain in place on wall 602.

Figure 13:
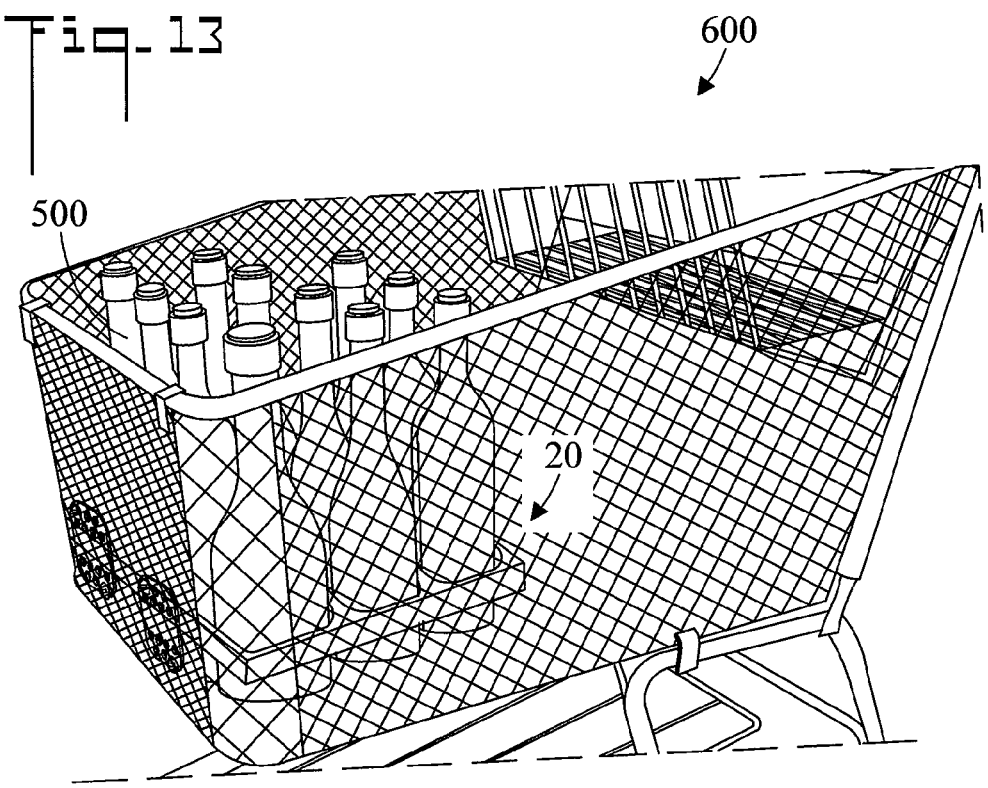
FIG. 13 is another reduced perspective view of the holder holding bottles in a shopping cart; and, FIG. 14 is a enlarged fragmented view of a wall of a shopping cart.

FIG. 13 is another reduced perspective view of holder 20 holding bottles 500 in a shopping cart 600.

Figure 14:
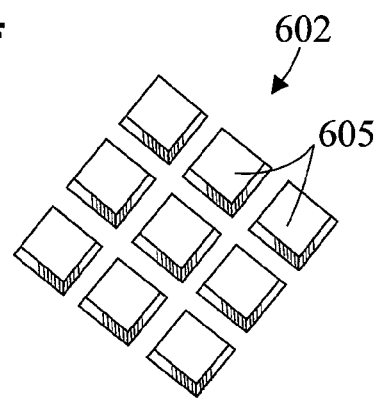

FIG. 14 is a enlarged view of a wall 602 of a shopping cart 600. Wall 602 is of open construction and contains a plurality of holes or openings 605 through which screw 31 (refer to FIGS. 5 and 11) can pass to effect connection of holder 20 to wall 600. Typically wall 602 can be made of a polymer mesh as shown, or can be made of spaced-apart wire members. Floor 604 of main compartment 603 (refer to FIG. 1) is of similar construction as wall 602.

In another embodiment, holder 20 is combined with shopping cart 600 to form a system for holding bottles 500.

In terms of use, a method for holding bottles 500 in a shopping cart 600 includes (refer to FIGS. 1-14):

(a) providing a shopping cart 600 having a wall 602 and a main compartment 603 having a floor 604;

(b) providing a plurality of bottles 500, each bottle 500 having a base 502;

(c) providing a holder 20 for holding bottles 500 in shopping cart 600 including:
    a rack 22 having a plurality of apertures 24 which are shaped and dimensioned to receive bottles 500;
    rack 22 is rotatably connectable to wall 602 of shopping cart 600 so that rack 22 is disposed in main compartment 603 of shopping cart 600;

(d) connecting rack 22 to wall 602 of shopping cart 600 so that rack 22 is selectively rotatable (1) to a not-in-use position substantially parallel to wall 602 of shopping cart 600, and (2) to an in-use position substantially parallel to floor 604 of main compartment 603;

(e) placing rack 22 in the in-use position; and, (f) inserting the plurality of bottles 500 into apertures 24 in rack 22 so that bases 502 rest upon floor 604 of main compartment 603.

The method further including:

in (f), bottles 500 serving to retain rack 22 in the in-use position.

The method further including:

in (c), a connector 26 for connecting rack 26 to wall 602 of shopping cart 600, connector 25 including a first member 28 which is rotatably connected to rack, and a second member 30, first member 28 of connector 26 including a biasing mechanism 34 which urges rack to the not-in-use position; and, in (d), connecting connector 26 to wall 602 of shopping cart 600 by clamping wall of shopping cart 600 between first member 28 and second member 30.

The method further including:
in (e), when rack 22 is in the in-use position, rack 22 is spaced apart from floor 604 of main compartment 603.

The method further including:
in (a), wall 602 being a front wall of shopping cart 600.

The embodiments of the holder and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the holder and method should be construed as limiting the invention to a particular embodiment or combination of embodiments. The scope of the invention is defined by the appended claims.

I claim:

1. A holder for holding bottles in a shopping cart, the shopping cart having a wall and a main compartment having a floor, the holder comprising:
    a rack having a plurality of apertures which are shaped and dimensioned to receive the bottles;
    said rack rotatably connectable to the wall of the shopping cart so that said rack is disposed in the main compartment of the shopping cart;
    when connected to the wall of the shopping cart, said rack selectively rotatable (1) to a not-in-use position substantially parallel to the wall of the shopping cart, and (2) to an in-use position substantially parallel to the floor of the main compartment;
    a connector for connecting said rack to the wall of the shopping cart;
    said connector including a first member which is rotatably connected to said rack, and a second member;
    wherein connection of said connector to the wall of the shopping cart is effected by clamping the wall of the shopping cart between said first member and said second member; and,
    said first member of said connector including a biasing mechanism which urges said rack to said not-in-use position.

2. A holder for holding bottles in a shopping cart, the shopping cart having a wall and a main compartment having a floor, the bottles each having a base, the holder comprising:
    a rack having a plurality of apertures which are shaped and dimensioned to receive the bottles;
    said rack rotatably connectable to the wall of the shopping cart so that said rack is disposed in the main compartment of the shopping cart;
    when connected to the wall of the shopping cart, said rack selectively rotatable (1) to a not-in-use position substantially parallel to the wall of the shopping cart, and (2) to an in-use position substantially parallel to the floor of the main compartment;
    when said rack is in said in-use position, the bottles being insertabe into said apertures so that the bases rest upon the floor of the main compartment;
    the bottles serving to retain said rack in said in-use position;
    a connector for connecting said rack to the wall of the shopping cart;
    said connector including a first member which is rotatably connected to said rack, and a second member;
    wherein connection of said connector to the wall of the shopping cart is effected by clamping the wall of the shopping cart between said first member and said second member;
    said first member of said connector including a biasing mechanism which urges said rack to said not-in-use position; and,
    said first member connectable to the wall of the shopping cart so that when said rack is in said in-use position, said rack is spaced apart from the floor of the main compartment.

3. A system for holding bottles, comprising:
    a shopping cart having a wall and a main compartment having a floor;
    a plurality of bottles, said bottles each having a base;
    a holder for holding said bottles in said shopping cart, said holder including;
    a rack having a plurality of apertures which are shaped and dimensioned to receive said bottles;
    said rack rotatably connected to said wall of said shopping cart so that said rack is disposed in said main compartment of said shopping cart;
    said rack selectively rotatable (1) to a not-in-use position substantially parallel to said wall of said shopping cart, and (2) to an in-use position substantially parallel to said floor of said main compartment;
    a connector for connecting said rack to said wall of said shopping cart;
    said connector including a first member which is rotatably connected to said rack, and a second member;
    wherein connection of said connector to said wall of said shopping cart is effected by clamping said wall of said shopping cart between said first member and said second member; and,
    said first member of said connector including a biasing mechanism which urges said rack to said not-in-use position.

4. A method for holding bottles in a shopping cart, comprising:
    (a) providing a shopping cart having, a wall and a main compartment having a floor;
    (b) providing a plurality of bottles, said bottles each having a base;
    (c) providing a holder for holding said bottles in said shopping cart, said holder comprising:
        a rack having a plurality of apertures which are shaped and dimensioned to receive said bottles;
        said rack rotatably connectable to said wall of said shopping cart so that said rack is disposed in said main compartment of said shopping cart;
    (d) connecting said rack to said wall of said shopping cart so that said rack is selectively rotatable (1) to a not-in-use position substantially parallel to said wall of said shopping cart, and (2) to an in-use position substantially parallel to said floor of said main compartment;
    (e) placing said rack in said in-use position;
    (f) inserting said plurality of bottles into said apertures in said rack so that said bases rest upon said floor of said main compartment;
    in (c), a connector for connecting said rack to said wall of said shopping cart, said connector including a first member which is rotatably connected to said rack, and a second member, said first member of said connector including a biasing mechanism which urges said rack to said not-in-use position; and,
    in (d), connecting said connector to said wall of said shopping cart by clamping said wall of said shopping cart between said first member and said second member.

5. The method of claim 4, further including:
in (e), when said rack is in said in-use position, said rack being spaced apart from said floor of said main compartment.

* * * * *